United States Patent
Rundqvist et al.

(10) Patent No.: US 6,479,789 B1
(45) Date of Patent: Nov. 12, 2002

(54) MANUFACTURE OF SCREEN PLATE WITH SCREEN SLOTS OBTAINED BY LASER BEAM CUTTING

(75) Inventors: Lars-Göran Rundqvist, Tumba (SE); Jan Backman, Järfälla (SE); Roine Andersson, Furusund (SE)

(73) Assignee: GL&V Sweden AB, Stockholm (SE)

( * ) Notice: Subject to any disclaimer, the term of this patent is extended or adjusted under 35 U.S.C. 154(b) by 0 days.

(21) Appl. No.: 09/508,409

(22) PCT Filed: Sep. 11, 1998

(86) PCT No.: PCT/SE98/01617

§ 371 (c)(1),
(2), (4) Date: Mar. 13, 2000

(87) PCT Pub. No.: WO99/13152

PCT Pub. Date: Mar. 18, 1999

(30) Foreign Application Priority Data

Sep. 12, 1997 (SE) .............................................. 9703316

(51) Int. Cl.[7] .............................................. B23K 26/38
(52) U.S. Cl. .............................................. 219/121.72
(58) Field of Search ................. 219/121.67, 121.71, 219/121.72, 121.8; 210/497.01

(56) References Cited

U.S. PATENT DOCUMENTS 4,795,560 A * 1/1989 Chupka et al. ........ 210/497.01
4,901,417 A * 2/1990 Chupka et al. ........ 219/121.67
5,607,589 A * 3/1997 Frejborg ................ 210/497.01
5,727,316 A * 3/1998 Riendeau

FOREIGN PATENT DOCUMENTS

| DE | 2600897 | * | 7/1977 | |
| EP | 0455312 | | 11/1991 | |
| JP | 6-262378 | * | 9/1994 | 219/121.67 |
| WO | 93/04797 | | 3/1993 | |
| WO | 98/29599 | | 7/1998 | |

OTHER PUBLICATIONS

Patent Abstracts of Japan, 50–4135, Jan. 14, 1993, Figures1–3.

* cited by examiner

Primary Examiner—Geoffrey S. Evans
(74) Attorney, Agent, or Firm—Browdy and Neimark

(57) ABSTRACT

A method for manufacturing a screen plate with screen slots from a thin plate (1), which screen slots (5, 13) are achieved by cutting. The plate is formed by bending to a screen plate of a desired shape. The screen slots (5, 13) are produced by a laser beam for cutting, which hits the plate from one of its sides, the inlet side. Focus for the beam is situated on a predetermined depth between both sides of the plate. The slot is obtained by at least two cutting operations following each other, in which the direction (3, 4) of the laser beam forms two different angles with the main plane of the plate. There is obtained a screen slot (5, 13), the cross section of which increases against the other side of the plate, the outlet side.

10 Claims, 2 Drawing Sheets

MANUFACTURE OF SCREEN PLATE WITH SCREEN SLOTS OBTAINED BY LASER BEAM CUTTING

Figure 1:
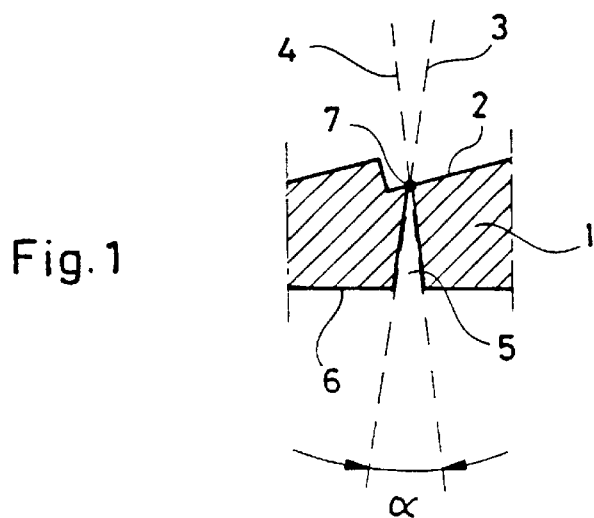

The present application is the National Stage under 35 U.S.C. 371 of PCT/SE98/01617, filed Sep. 11, 1998, which designated the United States and was published under PCT Article 21(2) in English.

The present invention relates to a method for manufacturing a screen plate from a thin plane plate with screen slots and a screen element comprising one or several screen plates. The screen slots are achieved by metal cutting. After this cutting the plate is formed to a screen plate of a desired shape.

To manufacture a cylindrical screen drum from a plate is described in WO 93/04797. According to this publication the starting material is a rectangular plate on one side of which a number of parallel grooves have been obtained by milling. The grooves have V-shape with a small plane area in their bottom. A number of supporting strips are then welded across the grooves. From the rear side of the plate screen slots are milled in front of the grooves. Finally the plate is bent to a drum with the V-shaped grooves turned outside. Through the bending the screen slots in the finished drum will be thinner than they were in the plate in its plane form.

The screen slots manufactured according to this publication are cut in a mechanical way. In order to obtain sufficiently thin slots the edges in the milling equipment must be sharp, which leads to frequent changes with accompanying high costs.

In U.S. Pat. No. 5,587,077 there is described another solution of the problem to obtain slot openings in a plate which is formed to a screen drum or screen plate. According to this publication the openings are cut with a water jet under high pressure. Firstly one produces a number of grooves on the side of the plate which in the produced screen plate shall be found on the inlet side. In a second moment there is obtained a number of openings or slots in the bottom of the grooves using the water jet which under high pressure is squirted against the plate. From the US publication it is seen that the formed opening expands towards the outlet opening with an angle of 4–8°.

EP 0 287 267 describes the manufacture of cylindrical screen drums where the cutting of the screen slots takes place by means of laser beams. This cutting takes place firstly when the plate has been formed into a cylinder. The laser beam is directed against the outer side of the cylinder and the formed slot obtains a diminishing cross-section with its broadest part on the outlet side of the cylinder. In the embodiments shown in the drawings the angle between the walls of the slots is relatively small.

In the description of U.S. Pat. No. 5,587,077 the drawbacks of laser cutting of screen slots are said to be that the screen slot has only a slight conical form (0–2°), that the problems with burrs on the outlet side for the laser beam are important and that the cost for cutting is high.

According to the invention it now has surprisingly been found that it is possible, using laser cutting, to obtain a screen plate with high capacity for the suspension which is to pass the screen plate. According to the method of the invention the screen slots are formed by means of a laser beam for metal cutting, at which the laser beam hits the plate from one of its sides, the inlet side, and where the focus for the beam is situated on a predetermined depth between both sides of the plate. The slot is created using at least two cutting operations, in which the direction of the laser beam forms two different angles against the main plane of the plate, at which there is obtained a screen slot the cross-section of which increases against the other side of the plate, the outlet side. In the described way screen slots with every desired form, straight, bent or wave-formed, may be obtained. The two cutting operations may be obtained with a single laser nozzle which moves to and fro or by use of two laser nozzles which have been orientated in relation to each other in a desired way. For reason of simplicity from hereon only one nozzle is mentioned. The different cutting operations may as said above take place with at least two nozzles. Of course each screen slot may be cut in three or several cutting operations if so is desired. In such a case the beam may for example firstly hit the screen plate at a right angle to the same and then in a later moment be slanted in order to cut the sloping walls of the screen slot.

According to the method of the invention the laser nozzle is with advantage arranged to take at least two positions for the cutting operation and the point in which said angles cross each other is situated in an area within or above the plate, where the upper limit is half the thickness of a plate above the upper surface of the plate and the lower limit half the plate thickness below the upper surface of the plate. The cross-section of the screen slot depends on where the beams cross each other. The desired cross-section is determined with knowledge of the application for which the screen plate shall be used.

According to a preferred embodiment the laser nozzle is arranged in such a way that the laser beam at both cuttings hits the plate along one and the same line, at which the obtained cross-section of the screen slot on one of its sides is determined by the laser beam at its first cutting while the other side of the cross-section is determined by the laser beam during the second cutting. In this case the beams cross each other at the upper surface of the plate.

According to the method of the invention one may with advantage arrange the laser nozzle in such a way that it is situated at the same distance from a line perpendicular to the plate starting from the slot opening. If the cutting is carried through in this way there is obtained a screen slot which has a center line perpendicular to the plate. If one prefers a screen slot the center line of which forms an acute or a blunt angle with the main plane of the plate the cutting takes place with laser beams, where the laser nozzle during both cuttings is situated on the same side of the line perpendicular to the plate starting from the slot opening.

Of course, a cutting may take place with the laser nozzle arranged such that the beam hits the plate perpendicularly to the plate in a first cutting operation, while the second cutting takes place with a beam which forms an acute or blunt angle against the plate. The choice of direction for the slots depends on the qualities of the suspension which is to be treated in the screen.

In order to facilitate the transport through the screen plate the walls of the screen slot is suitably cut such that the walls form an angle a extending 10°. With advantage the angle a is 10–30°.

In many applications it is suitable that the plate on its inlet side has long parallel grooves in the bottom of which the screen slots are cut. Such a corrugated surface may alternatively be obtained by welding strips of a desired shape on the inlet side of the plate.

The screen plate is with advantage produced by cutting the screen slots in a plate having a thickness of 2–8 mm. The width of the screen slots on the inlet side is 0,1–0.4 mm.

The screen plate may with advantage be ed into a cylindrical screen drum intended for a pressure screen for fiber suspensions.

Figure 2:
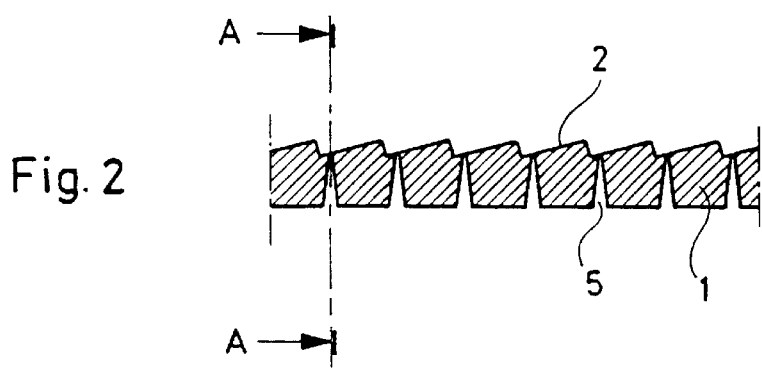
Figure 3:
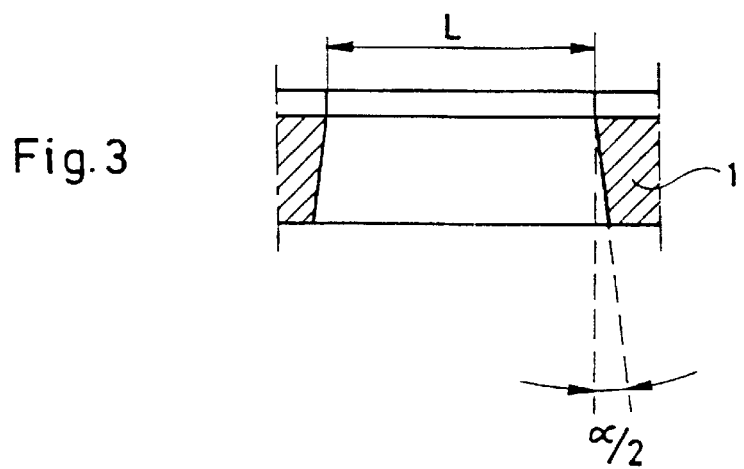
Figure 4:
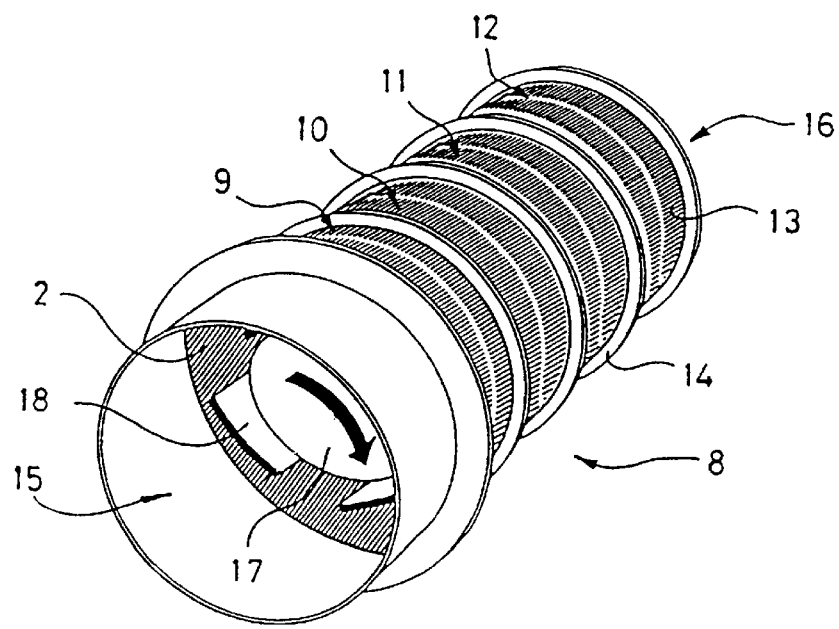
Figure 5:
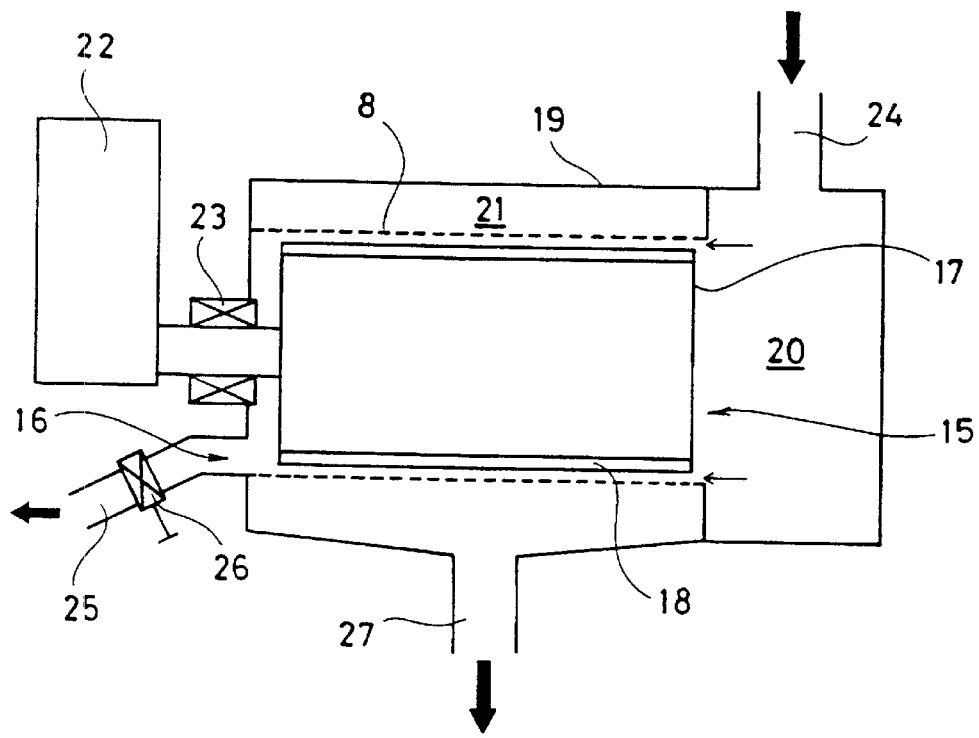

The present invention is described further with reference to the accompanying drawings, in which FIG. 1 shows a cross-section of a screen slot manufactured according to the method of the invention, FIG. 2 shows a cross-section of a screen plate with screen slots, FIG. 3 shows a cross-section A—A of a screen slot in FIG. 2, FIG. 4 shows a cylindrical screen with screen plates manufactured according to the invention and FIG. 5 shows schematically a longitudinal section through a pressure screen plant in which the cylindrical screen according to FIG. 4 may be used.

The attached drawing FIGS. 1–3 show a method of manufacturing a screen plate chosen as an example.

In FIG. 1 there is shown a cross-section of a part of a thin plate 1 provided with parallel transverse grooves 2. With dotted lines there is shown the direction of two laser beams 3 and 4 which create a slot 5 in the plate. The laser beams 4 and 5 start from a laser nozzle (not shown) arranged above the plate.

In a first cutting operation the laser nozzle is directed against the plate in such a way that a laser beam with a direction 3 forms an angle with the main plane of the plate (in this example a plane parallel with the bottom 6 of the plate). The laser beam hits the upper side of the plate in a point 7 and cuts a section through the plate 1. The focus of the laser beam is situated on a predetermined depth between both sides of the plate in order to obtain an optimal cutting. The laser beam is then moved along the screen plate in order to cut a slot of a desired length. When the slot length has been obtained the laser nozzle is moved such that the laser beam now will have another direction 4 against the main plane of the plate. The beam will still hit the plate 1 in the point 7 as it is returned to the first end of the slot along the same line in the plate as the laser beam followed during the first cutting operation. The formed slot has consequently a cross-section which increases from the upper side of the plate to the lower. The walls in the slot form as may be seen in FIG. 1 an angle a with each other. In the embodiment shown on the drawing the angle is 20°. As said earlier a is suitably between 10°and 30°. The slot has in its upper, narrower part a width of 0,2 mm.

In FIG. 2 there is shown a cross-section of a larger part of a screen plate produced according to the method of the invention.

In FIG. 2 reference is made to a cross-section A—A, which may be seen in FIG. 3 and shows the slot in longitudinal section along its length L. By forcing the laser nozzle to another angle when the beam shall change direction from 3 to 4 the beam may be forced to cut away a little part of the plate below the end points of the slot, such that the length of the slot is larger on the underside of the plate than on its upper side. This operation facilitates the removal of the part of the plate which shall be taken away.

In FIG. 4 there is shown an example of a shape of a manufactured screen drum with screen plates produced according to the method of the invention. The screen drum 8 comprises four separate cylindrical screen elements 9–12, which have been formed from four plates provided with screen slots 13 produced according to the method of the invention. The plates have been bent such that the inlet side of the plate is situated in the inner side of the screen drum. The slots consequently increase towards the outside. The four screen elements are detachably connected to each other by annular connection means 14. Alternatively the screen drum 8 may be designed in one piece. The screen drum has an inlet end 15 and a reject end 16.

In the drawing there is also shown a rotor 17 with rotor wings 18 arranged within the screen drum and the direction of rotation of the rotor. The long, parallel grooves in the screen plate are numbered 2.

The screen drum 8 which is shown in FIG. 4 may be used in the pressure screen schematically shown in FIG. 5. Such a pressure screen comprises a hollow house 19, the stationary screen drum 8 which divides the inner of the house 19 into a chamber 20 for pulp suspension which is to be screened through the screen drum 8 and an annular chamber 21 for collection of screened pulp suspension. The rotor 17 is operated by a motor 22. The rotor is journalled in bearings 23. The rotor 17 has rotor wings 18 extending axially along the rotor 17 at a small distance from the screen drum 8.

The rotor wings 18 prevent clogging of the screen slots 13 and maintain a flow of suspension in the circumferential direction of the screen.

The chamber 20 has an inlet 24 for supply of pulp suspension which is to be separated in the screen drum 8. The inlet end of the screen drum is numbered 15 and its outlet part with 16. At the outlet part 16 there is a reject outlet 25 with a valve 26 for control of the reject flow. The annular chamber 21 has an accept outlet 27 for purified suspension.

What is claimed is:

1. A method for manufacturing a screen plate with screen slots from a thin plate (1), which screen slots (5, 13) are obtained by cutting, after which the plate is bent into a screen plate of a desired shape, characterized in that the screen slots (5,13) are obtained by a laser beam for cutting, at which the laser beam hits the plate from one side, the inlet side, and that focus for the beam is situated on a predetermined depth between operations following each other, in which the direction (3,4) of the laser beams has two different angles against the main plane of the plate, at which there is obtained a screen slot (5, 13), the cross-section of which increases against the other side of the plate, the outlet side.

2. A method according to claim 1, characterized in that the laser nozzle is arranged to take at least two positions for the cutting operation and that the point in which said angles (3, 4) cross each other is situated in an area in or above the plate, where the upper limit is half the plate thickness above the upper surface of the plate and the lower limit is half the plate thickness below the upper surface of the plate.

3. A method according to claim 2, characterized in that the laser nozzle is arranged in such a way that the laser beam during said at least two cuttings meets the plate along one and same line, at which the cross-section of the obtained screen slot on one of its sides is determined by the laser beam at its first cutting, while the other side of the cross-section is determined by the laser beam at the second cutting.

4. A method according to claim 3, characterized in that the laser nozzle during said at least two cutting operations is situated on the same distance from a line perpendicular to the plate starting from the slot opening, at which a screen slot (5, 13) is obtained which has a center line perpendicular to the plate.

5. A method according to claim 3, characterized in that the walls of the screen slot (5, 13) form an angle ac exceeding 10°.

6. A method according to claim 5, characterized in that the laser nozzle is arranged to make a turning movement at the end points of the slot in such a way that the laser beam forms a slot with an enlarged cross-section also seen in its longitudinal section.

7. The method of claim 5 wherein said angle $\alpha$ is 10–30°.

8. A method according to claim 1, characterized in that the plate has a thickness of 2–8 mm and that the screen slots have a width of 0,1–0,4 mm on the inlet side.

9. A method according to claim 1, characterized in that the screen plate is formed to a cylindrical screen drum intended for a pressure screen for fibre suspensions.

10. A method according to claim 1, characterized in that the plate on the inlet side has long parallel grooves (2), in the bottom of which the screen slots are cut.

* * * * *